United States Patent [19]

Hamilton et al.

[11] Patent Number: 5,491,983

[45] Date of Patent: Feb. 20, 1996

[54] UNIVERSAL ACCUMULATOR DEHYDRATOR CONNECTOR ASSEMBLY

[75] Inventors: Lynn R. Hamilton; Scott A. Gerstung, both of Lockport, N.Y.

[73] Assignee: General Motors Corporation, Detroit, Mich.

[21] Appl. No.: 304,079

[22] Filed: Sep. 12, 1994

[51] Int. Cl.$^6$ .............................. F25B 43/00; F16L 35/00
[52] U.S. Cl. .................. 62/503; 137/577; 285/30
[58] Field of Search ................ 285/30, 131; 62/503, 62/509, 298; 137/577

[56] References Cited

U.S. PATENT DOCUMENTS

| | | | |
|---|---|---|---|
| 4,675,971 | 6/1987 | Masserang | 29/422 |
| 4,866,951 | 9/1989 | Masterson, II | 62/503 |
| 4,938,037 | 7/1990 | Carlisle, Jr. | 62/503 |
| 5,048,309 | 9/1991 | Carlisle, Jr. | 62/503 |
| 5,191,775 | 3/1993 | Shiina et al. | 62/503 |
| 5,354,101 | 10/1994 | Anderson, Jr. | 285/30 |
| 5,365,751 | 11/1994 | Mikesell et al. | 62/298 |
| 5,425,250 | 6/1995 | Hutchison et al. | 62/509 X |

FOREIGN PATENT DOCUMENTS 1-289714  11/1989  Japan ........................... B60H 1/32

OTHER PUBLICATIONS

Ser. No. 08/120198 Mikesell et al. Sep. 1993.

Primary Examiner—William E. Wayner
Attorney, Agent, or Firm—Patrick M. Griffin

[57] ABSTRACT

A simple connector assembly for an A/D canister that can accommodate a wide range of possible inlet and outlet line orientations and angles, both in terms of basic design and in terms of tolerance type variations within a design. An assortment of four possible independent block fittings, two straight and two ninety degree fittings, are used, one of each chosen depending on the inlet and outlet line orientation. Each pair is designated an outlet or an inlet fitting, and will fit only the proper depth socket in a canister end cap. The block fittings are basically cylindrical, and clamped in place by a standard clamp that has close fitting bearing surfaces on its side which allow any ninety degree fittings used to self align, in terms of angular orientation, as the clamp is tightened.

3 Claims, 6 Drawing Sheets

UNIVERSAL ACCUMULATOR DEHYDRATOR CONNECTOR ASSEMBLY

This invention relates to vehicle air conditioner system accumulator dehydrators in general, and specifically to a connector assembly in which a single end cap and clamp combined with an assortment of block fittings allow a standard cylindrical canister to be connected to in and out supply lines that have a wide range of different orientations relative to the canister.

Background of the Invention

Vehicle air conditioning systems include an evaporator from which heated vapor that has been heated by vehicle cabin air exits to a compressor. Intermediate the evaporator and compressor is an accumulator dehydrator assembly, often called an A/D assembly, which is basically a cylindrical canister that allows liquid refrigerant to settle out, so that it won't be pulled directly into the compressor. Instead, the compressor draws refrigerant indirectly from the evaporator, through the canister, and primarily in vapor form, which is more efficient. In addition, bags of desiccant are typically included in the canister to dry the refrigerant.

The A/D assembly, the evaporator line into it, the compressor line leaving it, the compressor, and myriad other components are located under the hood or cowl of the vehicle. With the advent of more aggressive cab forward body designs and lower hood lines, there is less and less underhood space available, and the need for ever more compact designs. In addition, there is the need for more flexibility in locating and orienting the A/D assembly when body designs are changed or modified, and the need to commonize more and more components to serve several body designs.

Typical A/D assembly designs are well illustrated in U.S. Pat. No. 4,675,971. The lines may enter the canister near the top, a so called top feed design, or the bottom of the canister. The fittings in and out of the canister are fixed in orientation, and if the orientation or location of the lines were changed, the canister design would have to be changed, as well. Attempts have been made to provide a more universal or adaptable design. An example may be seen in U.S. Pat. No. 5,048,309. The outlet port 28 to the canister is L-shaped, bent to the side, and has a threaded fitting 46 at the canister center which, when loosened, allows it to be rotated to all points of the compass, in effect. A drawback of any rotatable connection is that it's seal is not solid, as a weld or braze would be. Also, the fitting 46 would have to be loosened and tightened by a wrench that would swing to the side, requiring a good deal of tool access room. Only a ninety degree outlet line could be fitted to the outlet 28, of course, and only the outlet is angularly adjustable, not the inlet 26. In addition, each input and output line would have to be separately attached to its fitting with another threaded fitting.

A newer A/D assembly design is disclosed in co-assigned U.S. Pat. No. 5,365,751, which solves many of the problems outlined above. As disclosed there, the canister has an end cap with two different sets of interior plumbing, so that the canister can be oriented as a top or bottom feed canister. A single block fitting can be attached or removed from the canister end cap with a single bolt that lies on the canister axis. The inlet and outlet supply lines are brazed in place, making a leak proof seal, and then the single fitting is bolted to the end cap in one step, with a tool that can turn on the canister axis, and need not swing to the side. Stationary O-ring type seals on the block fitting give a secure, leak proof seal. The block fitting can accommodate either straight or ninety degree orientations of the inlet and outlet lines to the canister. The supply lines enter the single block fitting only in a straight orientation, however, parallel to the axis of the canister. Accommodating a ninety degree supply line, which typically is an aluminum tube, requires that it be bent, which cannot generally be done sharply or over an axially compact curve. Furthermore, brazing both the inlet and outlet supply line to the single block fitting is somewhat inflexible in the sense that each line must be accurately cut and bent beforehand, and cannot be adjusted later.

Summary of the Invention

The invention provides a more flexible supply line connector assembly that can be used with the type of A/D canister described above, which can accommodate a wider range of orientations for both supply lines, and which is more easily adjusted and more compact.

In the embodiment disclosed, a standard end cap similar to that described above has a flat, planar outer surface through which a pair of side by side, cylindrical sockets are machined, near and parallel to the canister central axis. One of the sockets, either the inlet or the outlet, is deliberately made deeper than the other. A threaded hole in the end cap lies on the central axis between the sockets. A detachable clamp has a central threaded ferrule that mates to the end cap, and a pair of partially cylindrical bearing surfaces equally spaced to either side thereof. When the clamp is in place, each of the bearing surfaces concentrically surrounds an end cap socket. The clamp also has a pair of coplanar, flat forked wings that overlay the end cap sockets, spaced from the end cap outer surface by a predetermined amount. Each wing is wider than the diameter of the supply lines.

An assortment of four different block fittings, two inlet fittings and two outlet fittings, completes the assembly. All four of the block fittings have an axial thickness just equal to the clamp spacing. Each also has a cylindrical body that closely engages a clamp bearing surface, so as to turn therewithin. The two possible inlet fittings have a cylindrical plug the proper depth to fit properly, when clamped, only into the end cap's inlet socket, while the two possible outlet fittings are similarly configured relative to the end cap's outlet socket. One each of the possible inlet and outlet fittings is straight, parallel to the socket/plug co-axis, and the other, a side or ninety degree fitting, is perpendicular.

To install the A/D canister, the supply lines, either of which may run vertically or horizontally, are cut to length. Then, the appropriate one of each of the two possible pairs of block fittings is brazed to the end of the supply lines. Next, the plugs are inserted in the proper canister end cap sockets, and the clamp is threaded into place, drawing the wings down tight on top of the matching thickness block fittings. As the bolt is tightened, the block fittings can twist independently of one another on the clamp bearing surfaces so as to accommodate the angle of any horizontally running supply lines. Any vertically oriented supply lines fit freely out through the clamp wings, while horizontally running supply lines fit beneath the clamp wings in a low profile, compact manner. Should a fitting be inserted incorrectly, the clamp will not fit flush down on top of the fittings, which will be clear to the installer.

Description of the Preferred Embodiment

These and other advantages of the invention will appear from the following written description and from the drawings, in which.

Figure 1:
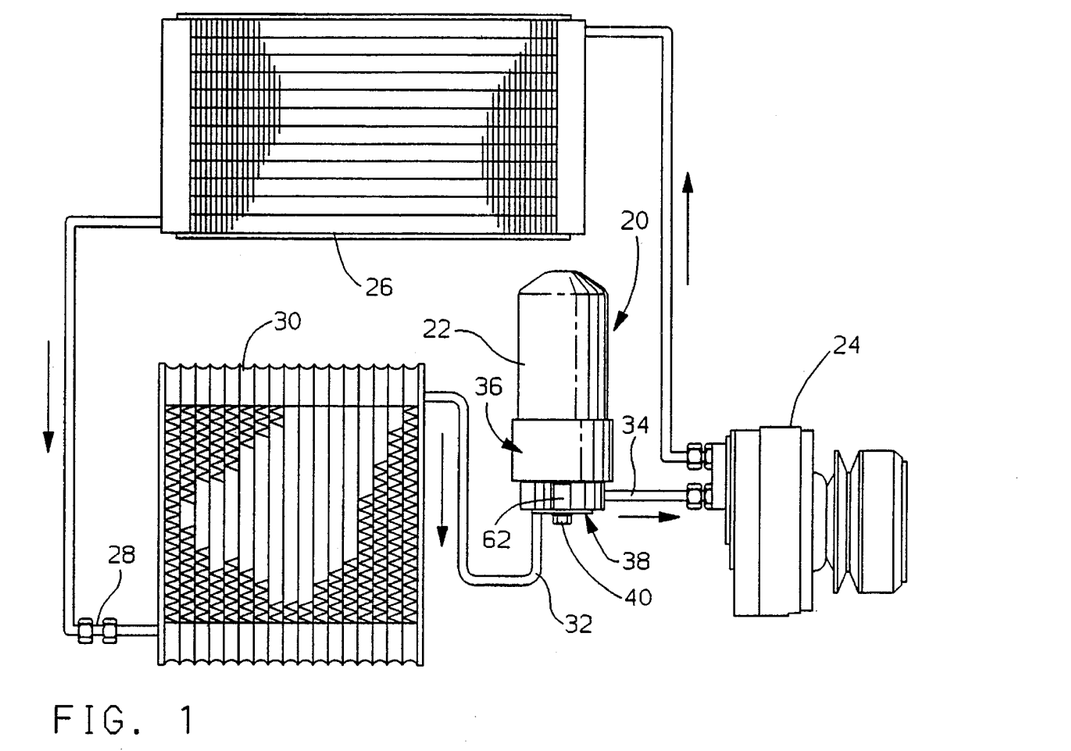
FIG. 1 is a system schematic showing a typical vehicle air conditioning system.

Referring first to FIG. 1, the connector assembly of the invention, indicated generally at 20, is shown in one possible configuration, joining a cylindrical canister body 22 to the rest of a vehicle air conditioning system. A compressor 24 sends high pressure, hot refrigerant to a condenser 26 where it is cooled, then expanded through an expansion valve 28 and sent to an evaporator 30, where it absorbs heat from cabin air blown across it. From evaporator 30, a low pressure mix of liquid and vapor refrigerant, as well as entrained lubricant, flows through an inlet line 32 into canister body 22, where liquids can settle out. From there, refrigerant vapor is drawn from the top of canister body 22 through a low pressure suction or outlet line 34 and back to compressor 24 to repeat the cycle. Because of the many possible locations of the compressor 24 and evaporator 30 under the hood of any particular vehicle, the inlet line 32 and outlet line 34 may have an almost infinite number of orientations relative to the canister body 22. The supply lines 32 and 34 are generally tubular aluminum, so that they can be brazed to other aluminum components. As such, while they can be bent to shape, they are relatively inflexible once bent, certainly as compared to rubber or plastic hoses. The connector assembly 20 of the invention accommodates these myriad possible orientations in an easy to install and compact manner.

Referring next to FIGS. 7 through 10, the connector assembly 20 includes a standard canister end cap, indicated generally at 36, a standard clamp, indicated generally at 38, bolt 40, an assortment of four possible block fittings, indicated generally at 42–48, of which two would be chosen in any particular case. Specifically, these include a straight inlet fitting, 42, a side or ninety degree inlet fitting 44, a straight outlet fitting 46, and a side or ninety degree outlet fitting 48. Details of these basic components are described next.

Figure 2:
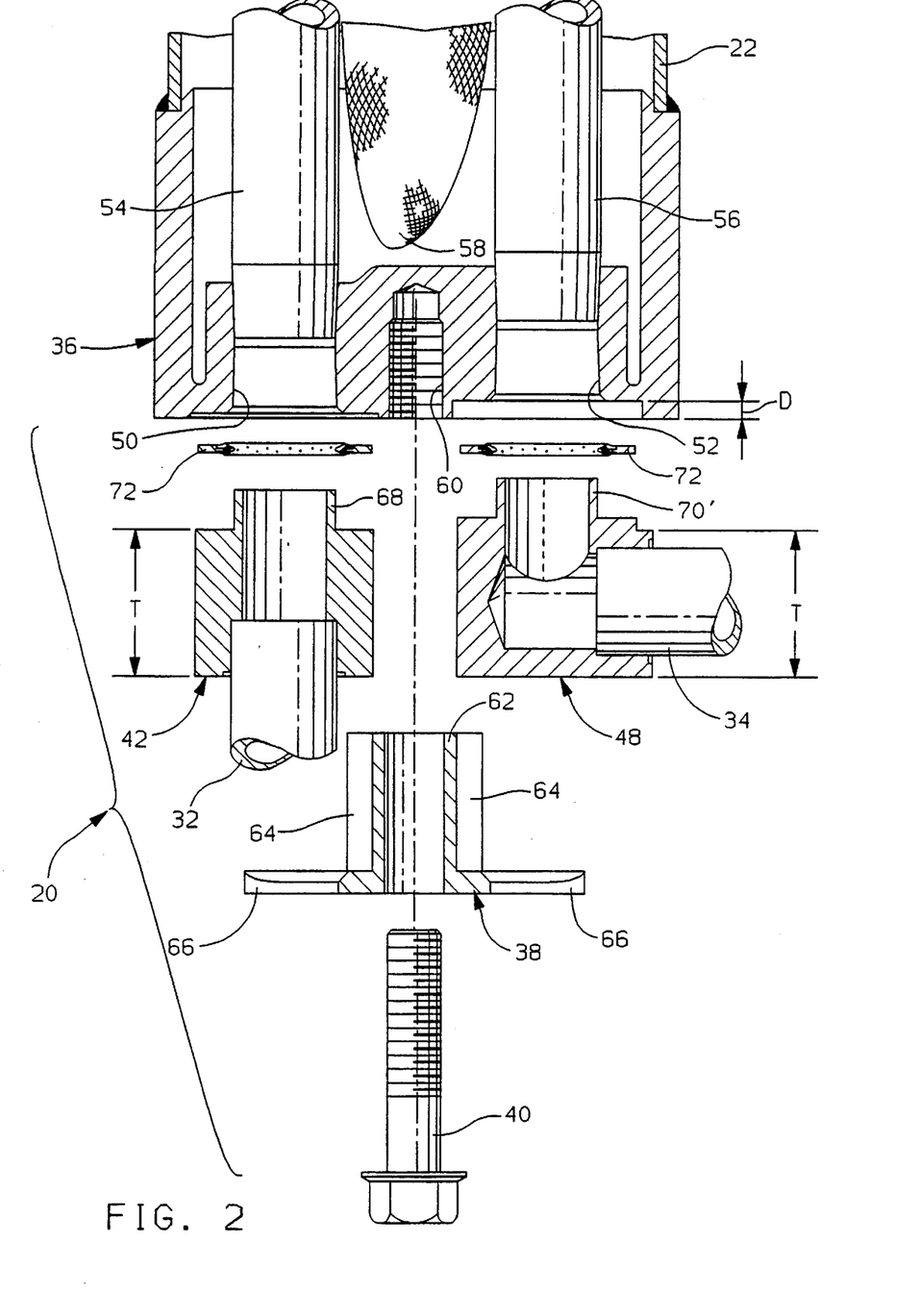
FIG. 2 is an exploded view of one configuration of the invention, showing the end cap, clamp and block fittings in cross section.

Referring next to FIG. 2, end cap 36 is a heavy cast or machined aluminum part with a flat outer surface that is welded to canister body 22 to close its open end. A pair of side by side cylindrical sockets, an inlet socket 50 and an outlet socket 52, are bored through end cap 36 parallel to and close to the central axis. For the particular orientation of canister body 22 shown, bottom feed, a corresponding inlet pipe 54 and outlet pipe 56 are fitted to the inside of the respective sockets 50 and 52, within canister body 22, as well as a desiccant bag 58. If canister body 22 were reversed to a top feed orientation, then different inlet and outlet pipes would be selected, but the same end cap 36 would be used, a feature in common with the co-assigned application referred to above. The sockets 50 and 52 have the same diameter, but one, the outlet socket 52 as disclosed, is deliberately made deeper than the other, as measured relative to the flat surface of cap 36, and indicated at D. A closed end threaded bore 60 lies on the center axis between the sockets 50 and 52.

Figure 6:
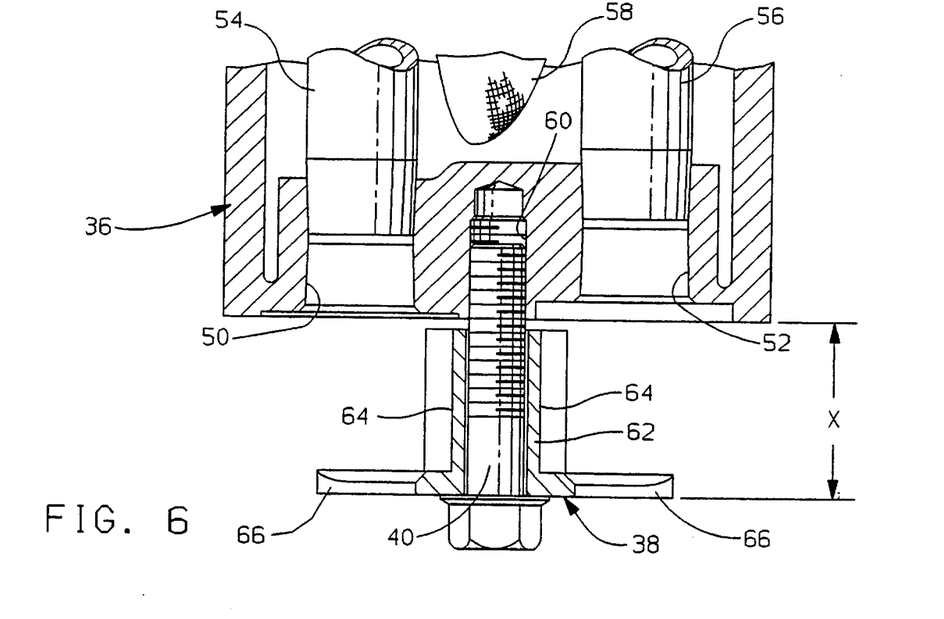
FIG. 6 shows the clamp in place without block fittings.
Figure 7:
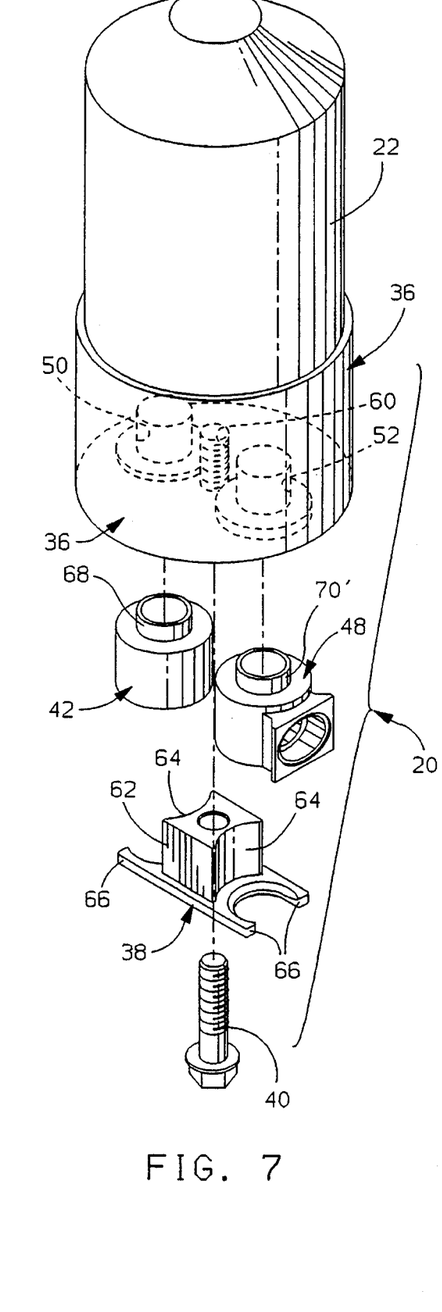
FIG. 7 is a perspective exploded view of the FIG. 3 configuration.
Figure 8:
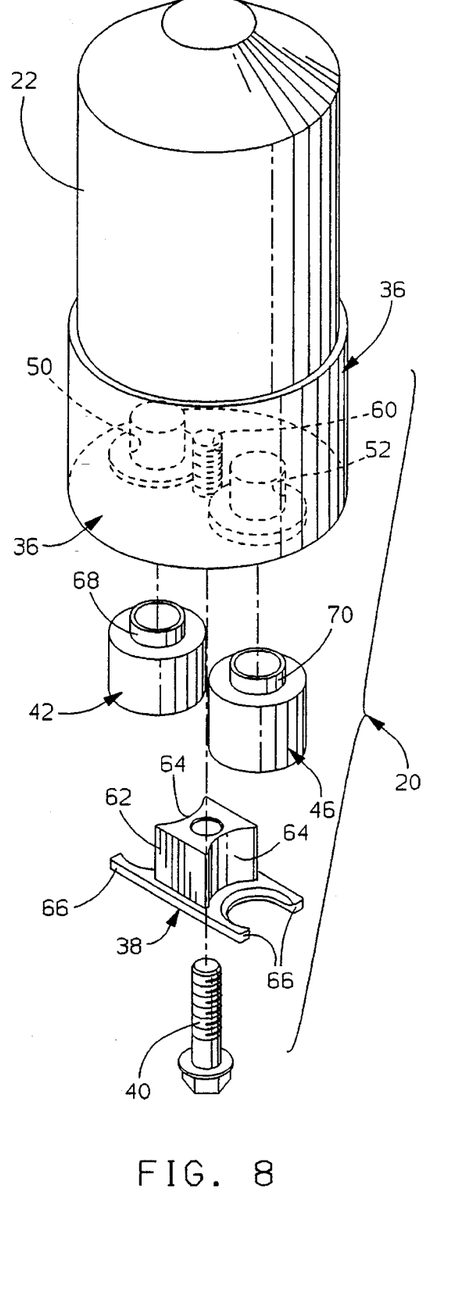
FIG. 8 is a perspective exploded view of the FIG. 4 configuration.
Figure 9:
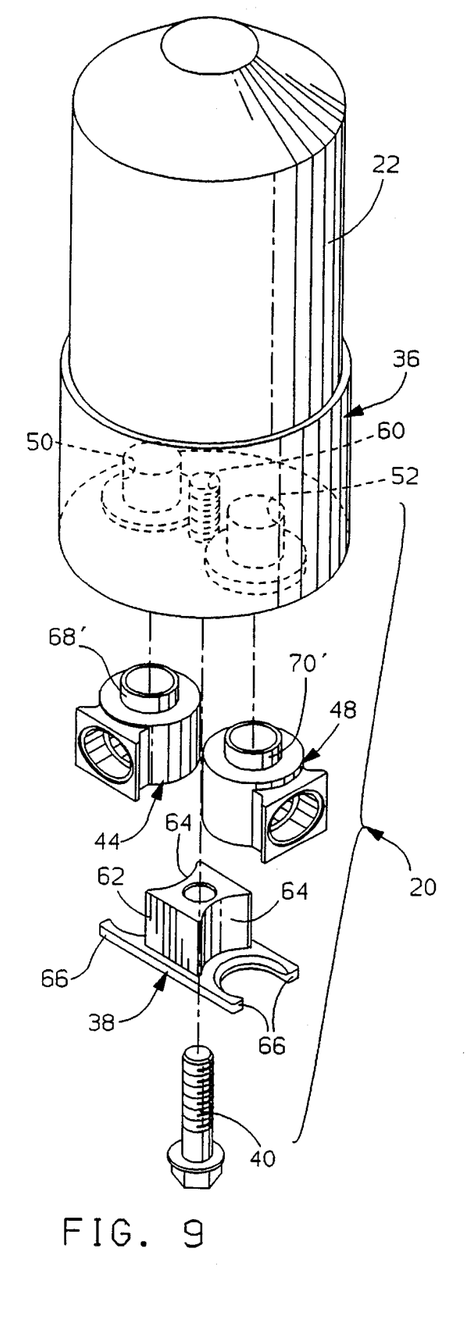
FIG. 9 is a perspective exploded view of another possible configuration.
Figure 10:
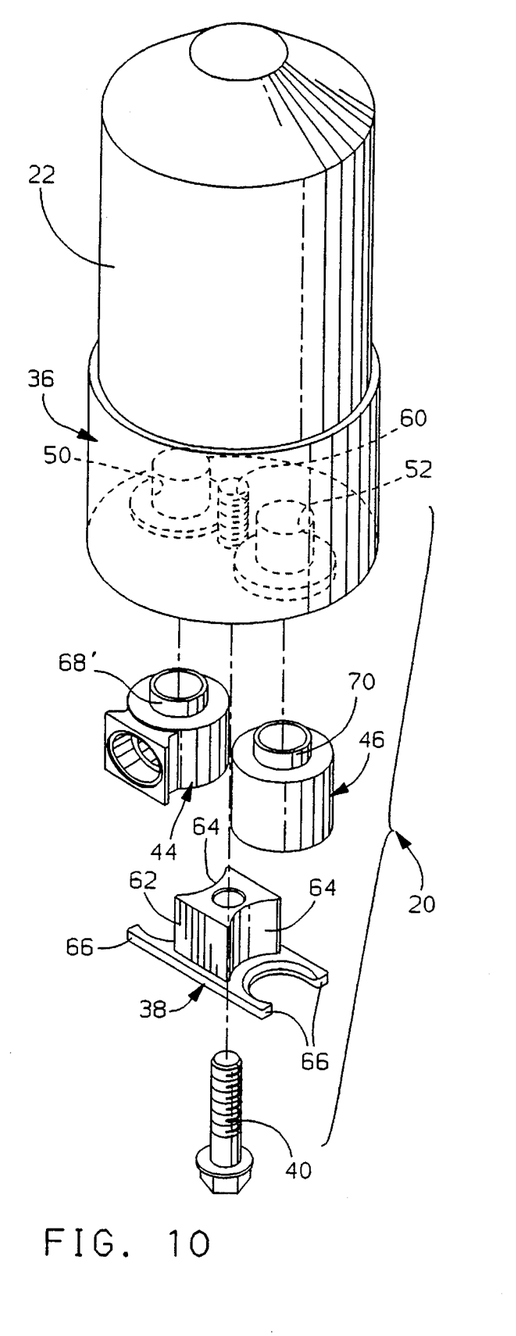
FIG. 10 is a perspective exploded view of yet another possible configuration.

Referring next to FIG. 6, clamp 38 has a central ferrule 62 that aligns with end cap bore 60. This allows it to be attached by bolt 40 to end cap 36, as shown in FIG. 6. It will be noted that the bottom of ferrule 62 does not seat directly on the flat surface of end cap 36 in its attached position, for a reason described below. Formed on the sides of ferrule 62 are a pair of symmetric, semi-cylindrical bearing surfaces 64 which, when clamp 38 is attached, concentrically surround the sockets 50 and 52. A coplanar pair of same size wings 66 extend radially out from and perpendicular to the bearing surfaces 64 to overlay the end cap sockets 50 and 52. Each wing 66 is C-shaped or forked, and wide enough to pass the diameter of either supply line 32 or 34, should that line happen to have a straight out orientation. When the clamp 38 is attached, the underside of the coplanar wings 66 is spaced from the outer surface of end cap 36 by an axial distance X, which is matched to another component dimension, described next.

Referring next to FIGS. 2 and 7 through 10, the four possible block fittings 42 through 48 have some common features that are related to the clamp 38 and to the supply lines 32 and 34, and some unique features related to the sockets 50 and 52. All four have a thickness T, as measured from their top surfaces, that is equal to the distance X noted above, but which is somewhat larger than the diameter of either supply line 32 or 34. All four have a body diameter that matches the clamp bearing surfaces 64, and an open plug that matches the diameter of a socket 50 or 52. However, the two possible inlet fittings, straight 42 and ninety degree 44, have an effectively shallower plug, 68 and 68' respectively, which matches only the inlet socket 50. The two possible outlet fittings, straight 46 and ninety degree 48, have an effectively deeper plug 70 and 70', which matches only the outlet socket 52. A pair of standard annular sealing washers 72 fits over either plug 68 or 70 and into either socket 50 or 52. Both of the straight block fittings, 42 and 46, as the name indicates, are joined to their respective supply lines 32 and 34 coaxially to their plugs 68 and 70. Likewise, both of the side or ninety degree block fittings, 44 and 48, are joined to their supply lines 32 and 34 perpendicular to their plugs 68' and 70'.

Referring next to FIGS. 1 and 2, to install the A/D canister 22 in any particular vehicle design, a location axis for canister 22 is established, that is, an axis on which it can lie as it is fixed to a suitable piece of body architecture. Canister 22 will generally be fixed in place by a gripping band. Then, the length and shape that the inlet line 32 and outlet line 34 will need in order to run to, or at least close to, the established axial line is determined. This, in turn will depend upon the particular locations and orientations of the compressor 24 and evaporator 30 relative to the canister 22. Either line 32 or 34 may run horizontally or vertically in any particular design application, and therefore be oriented either perpendicular to or parallel to the axis of canister 22, and relative to the axes of the sockets 50 and 52. Any horizontally running supply line may have any possible angular orientation relative to the axes of the sockets 50 and 52. Next, a top or bottom feed orientation for the canister 22 is chosen, depending on whether there is room above or below the location of the lines 32 and 34. A bottom feed orientation is shown here. Then, the appropriate inlet and outlet pipes 54 and 56 are chosen and fixed to the inside of end cap 36, desiccant bag 58 is added, and end cap 36 is secured to the open end of canister 22, as shown in FIG. 2. Next, depending on the orientation of the supply lines 32 and 34, either a straight or a ninety degree fitting 42–48 is chosen. For the embodiment disclosed in FIGS. 1 and 2, with a vertically running inlet line 32 and horizontally running outlet line 34, the straight inlet fitting 42 and ninety degree outlet fitting 48 respectively are selected. Then, the block fittings 42 and 48 are brazed or otherwise secured to the ends of the respective supply lines 32 and 34. At the same time, the appropriate fitting for attachment to the evaporator 30 and compressor 24 respectively would be brazed on to the other ends of the lines 32 and 34.

Figure 3:
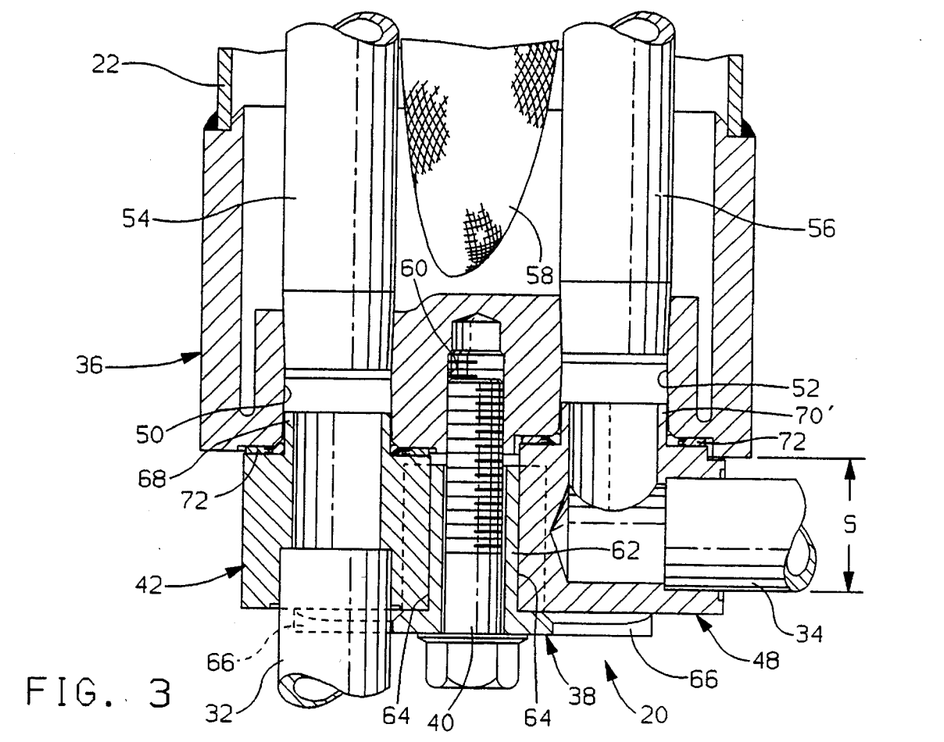
FIG. 3 shows the FIG. 2 configuration assembled.

Referring next to FIGS. 2 and 3, the installer will have a canister 22 (with end cap 36 attached) and the cut to length supply lines 32 and 34 with the proper fittings 42 and 48 already brazed on. Seal washers 72 would be fitted over the plugs 68' and 70 at any convenient point in the process, after brazing. Canister 22 would then be banded in place, and the supply lines 32 and 34 would be attached at their opposite ends to evaporator 30 and compressor 24 respectively. At this point in the installation process, the supply lines 32 and 34 would be hanging underhood in whatever position and orientation their weight and length would naturally put them in. Different vehicles may well have the lines 32 and 34 oriented slightly differently, car to car, especially if they have a long run. The FIG. 2 orientation, with all components aligned, would be unlikely, although the fittings 42 and 48 would be resting close to the end cap 36. Next, the installer would take a clamp 38 and bolt 40 and manually hold straight inlet fitting 42 against the clamp bearing surface 64 on one side, with wing 66 fitting around and clear of the vertically oriented inlet line 32. Simultaneously, the side outlet fitting 48 would be held against the other bearing surface 64 and under the other wing 66. Then, the plugs 68 and 70' are inserted in the respective sockets 50 and 52, and bolt 40 is threaded into bore 60 until tight. In some cases, especially if the canister 22 is in a top feed orientation, it may be possible to insert one or more fittings into the sockets 50 and 52 first, before the clamp 38 is added. As bolt 40 is tightened, the fittings 42 and 48 are axially trapped by the clamp wings 66, and radially confined within the sockets 50 and 52. However, the clamp wing 66, being perpendicular to the bearing surface 64, does not prevent the fitting 48 from twisting underneath it, about the axis of the outlet socket 52 and against the bearing surface 64, at least not until clamp 38 is fully tightened. The ninety degree outlet fitting 48 can thereby self adjust to the proper angular orientation, independently of the straight inlet fitting 42, and without any interference from the overhanging wings 66. This compensates for any car to car build variations. Angular self adjustment relative to the socket axis is not needed for any straight out supply line like 32, of course, but the inlet line 32 may run to the side in other designs, as described below. This self adjustment process is basically transparent to the installer, who simply tightens bolt 40. Each fitting can self adjust independently of the other because it is not part of a single block. In addition to being independently self seating and self adjusting, the invention provides an axially compact package. When clamp 38 is fully seated, it allows any ninety degree supply line, such as outlet line 34, to exit within an axial space S from end cap 36 that is much smaller than would be possible if outlet line 34 had to be bent and curved 90 degrees out and away. When fully tightened, the clamp bearing surfaces 64 help stabilize and support the close fitting block fittings 42 and 48. The clamp ferrule 62 does not hit the outer surface of the end cap 36, so as to not interfere with the full compression of the seal washers 72, when clamp 38 is tightened.

Figure 11:
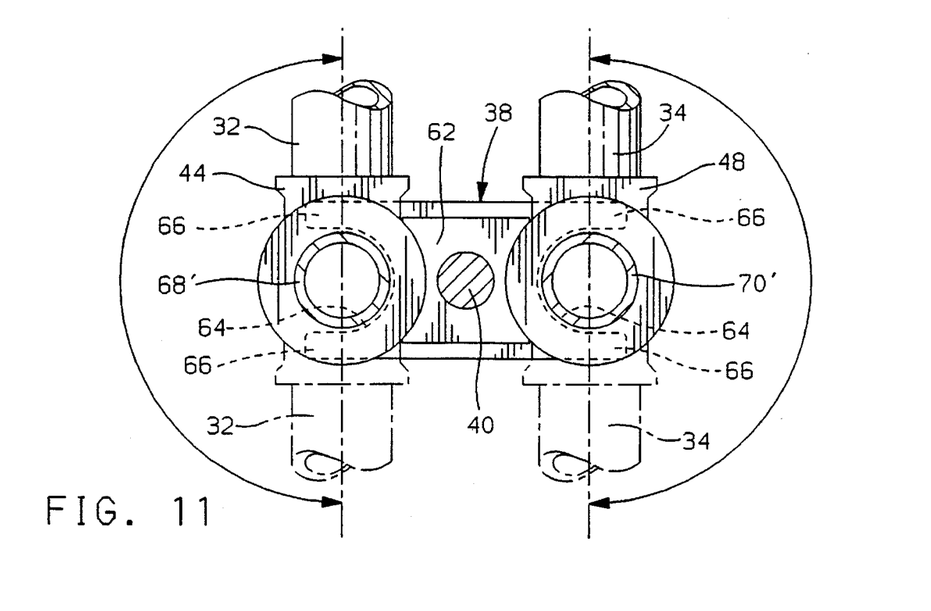
FIG. 11 is a schematic view showing the range of possible orientations of the FIG. 9 configuration.

Referring next to FIGS. 7 through 11, it may be seen how the invention accommodates design variations, just as well as build variations within a particular design. As noted above, the supply lines 32 and 34 may each be either vertical or horizontal in a particular design. An appropriate block fitting from the four alternatives 42–48 may be chosen to match each possible supply line orientation. FIGS. 7–10 show the four total possible combinations of straight or side fittings 42–48. Any supply line that is horizontal as it approaches the canister 22 will require a ninety degree or side fitting, and may be oriented relative to the axes of the sockets 50 and 52 over a wide range of possible angles. This range of possible angles for the two ninety degree fittings 44 and 48 is illustrated in FIG. 11. Any angle is possible, because the clamp bearing surfaces 64 and wings 66 do not restrict the fittings from turning in the sockets. Each possible fitting combination works with the same standard end cap 36, clamp 38, and bolt 40, and is installed in the same fashion. Each combination of block fittings self seats and adjusts to the lines 32 and 34 as it is installed, just by tightening the single bolt 40. In addition, by comparing FIGS. 4 and 5, it may be seen how incorrect assembly is avoided.

Figure 4:
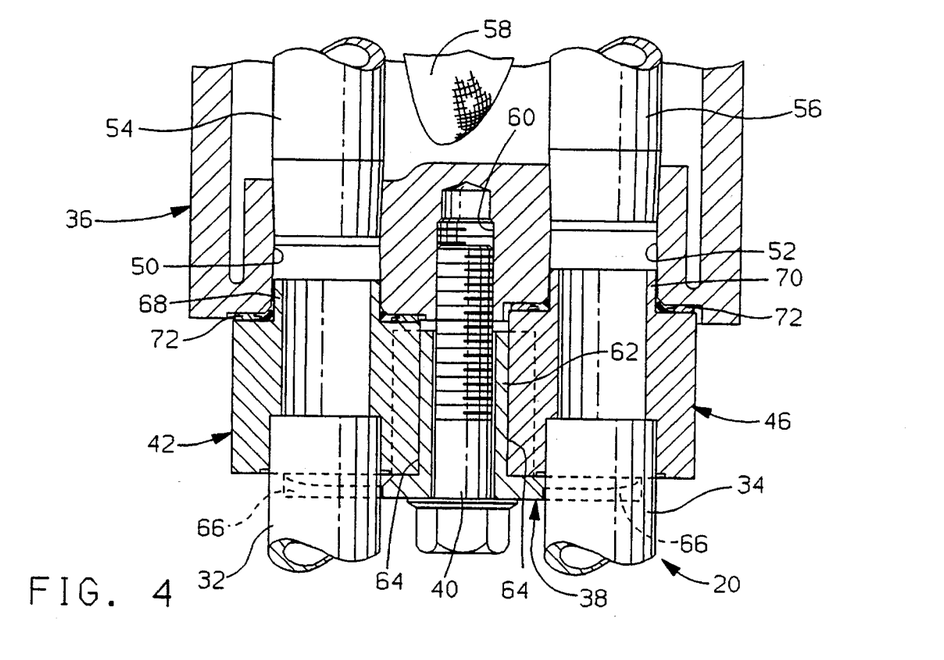
FIG. 4 is a view like FIG. 3, showing another possible configuration.
Figure 5:
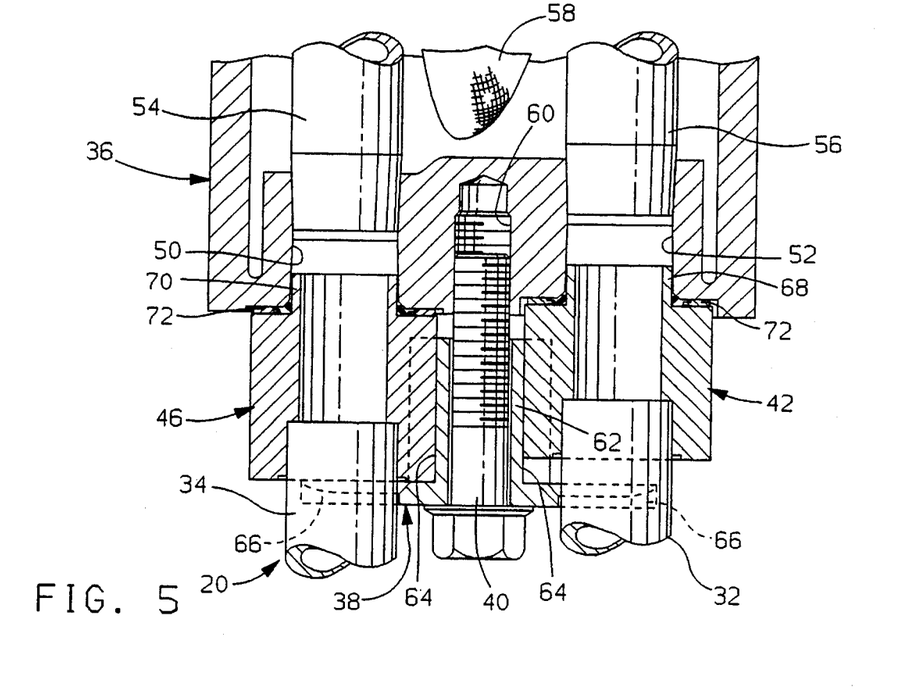
FIG. 5 shows the block fittings of FIG. 4 switched.

By comparing FIGS. 4 and 5, it may be seen how inadvertent supply line switching is avoided during installation. FIG. 4 shows the combination of two straight block fittings 42 and 46, each seated in the proper socket 50 and 52. FIG. 5 shows the result if the block fittings 42 and 46 are incorrectly set into the sockets 50 and 52. This could occur either because the lines 32 and 34 were pulled out of position, or because the canister 22 was turned 180 degrees off when it was installed. Because of the depth differential of the plugs 68 and 70, the clamp wing 66 will not seat on the top surface of the misplaced inlet fitting 42, which will be immediately obvious to the installer and easily corrected. The same would apply to any switched combination of block fittings.

Variations in the embodiment disclosed could be made. The differential depth sockets 50 and 52 could instead have a standard depth, which would reduce the array of four block fittings effectively to two, one straight and one ninety degree, either of which would fit either socket. The bolt 40 for the detachable clamp 38 could be replaced by some other sort of fastener. However clamp 38 is attached, however, it is desirable that its fastener be on the center axis, so that the fittings can be twisted under the clamp wings over the widest possible angle range, without interference. If the block fittings were sufficiently wide, then they could have sufficient flat surface area close to the clamp ferrule to allow a much more radially narrow clamp wing to hold them in place while clearing any straight out supply pipes, like inlet line 32. In that case, wider, forked wings like 66 would not be needed to in order to allow pass straight supply pipes to pass through. The forked design is particularly useful, however, since it puts a sufficiently large clamping surface in contact with a side fitting, but allows the line in a straight fitting to pass through unhindered. Therefore, it will be understood that it is not intended to limit the invention to just the embodiment disclosed.

The embodiments of the invention in which an exclusive privilege or property are claimed are defined as follows:

1. A universal accumulator dehydrator connector assembly adapted for use with an open ended cylindrical canister body to which input and output supply lines of varying orientation and location are intended to be joined, comprising,     an end cap sized to close said canister body and having a planar outer surface and a pair of side by side, cylindrical sockets therethrough proximate to and parallel to the center axis of said canister body,     a detachable clamp having a central fastener securable to said end cap between said sockets and a pair of partially cylindrical bearing surfaces symmetrically disposed relative to said fastener and concentrically surrounding said sockets, said clamp also having a pair of coplanar wings extending radially outwardly from said clamp perpendicular to said bearing surfaces and overlaying said end cap with a predetermined spacing, and,     an assortment of block fittings each having a thickness equal to said predetermined spacing, a cylindrical plug sized to fit said end cap sockets, a cylindrical body closely engageable with said clamp bearing surfaces, at least one of said fittings being adapted to be secured to a straight supply line coaxial to said plug and one adapted to be secured to a ninety degree supply line perpendicular to said plug,     whereby said block fittings may be clamped to said end cap beneath said wings, while any perpendicular supply lines can self adjust relative to said end cap by turning on said bearing surface and within said socket before said clamp is fully tightened.

2. A universal accumulator dehydrator connector assembly adapted for use with an open ended cylindrical canister body to which input and output supply lines of varying orientation and location are intended to be joined, comprising,     an end cap sized to close said canister body and having a planar outer surface and a pair of side by side, cylindrical sockets therethrough proximate to and parallel to the center axis of said canister body,     a detachable clamp having a central fastener securable to said end cap between said sockets and a pair of partially cylindrical bearing surfaces symmetrically disposed relative to said fastener and concentrically surrounding said sockets, said clamp also having a pair of coplanar, generally fork shaped wings with a width greater than said supply line diameter and extending radially outwardly from said clamp perpendicular to said bearing surfaces and overlaying said end cap sockets with a predetermined spacing, and,     an assortment of block fittings each having a thickness equal to said predetermined spacing, a cylindrical plug sized to fit said end cap sockets, a cylindrical body closely engageable with said clamp bearing surfaces, at least one of said fittings being adapted to be secured to a straight supply line coaxial to its plug and one adapted to be secured to a ninety degree supply line perpendicular to its plug,     whereby said block fittings may be clamped to said end cap beneath said wings, with any straight supply line passing through said wing while any ninety degree supply lines can self adjust relative to said end cap by turning on said bearing surface and within said socket before said clamp is fully tightened.

3. A universal accumulator dehydrator connector assembly adapted for use with an open ended cylindrical canister body to which input and output supply lines of varying orientation and location are intended to be joined, comprising,     an end cap sized to close said canister body and having a planar outer surface and a pair of side by side, cylindrical sockets therethrough proximate to and parallel to the center axis of said canister body, one of said sockets having a greater depth than the other, shallower socket,     a detachable clamp having a central fastener securable to said end cap between said sockets and a pair of partially cylindrical bearing surfaces symmetrically disposed relative to said fastener and concentrically surrounding said sockets, said clamp also having a pair of coplanar wings extending radially outwardly from said clamp perpendicular to said bearing surfaces and overlaying said end cap with a predetermined spacing, and,     an assortment of four block fittings each having a thickness equal to said predetermined spacing, a cylindrical body closely engageable with said clamp bearing surfaces, one pair of said block fittings having a plug adapted to fit only said deeper socket and the other pair a plug adapted to fit only aid shallower socket, one of said block fittings of each pair being adapted to be secured to a straight supply line coaxial to its plug and one adapted to be secured to a ninety degree supply line perpendicular to its plug,     whereby said block fittings may be clamped to said end cap beneath said wings, thereby assuring said supply lines to be matched to the proper end cap socket, while any perpendicular supply lines can self adjust relative to said end cap by turning on said bearing surface and within said socket before said clamp is fully tightened.

\* \* \* \* \*